Oct. 20, 1959  G. J. PLATT  2,908,965
METHOD OF MOTOR MANUFACTURE
Filed Jan. 22, 1954

INVENTOR.
GEORGE J. PLATT
BY
Wheeler, Wheeler & Wheeler
ATTORNEYS

United States Patent Office 2,908,965
Patented Oct. 20, 1959

2,908,965

METHOD OF MOTOR MANUFACTURE

George J. Platt, Manitowoc, Wis., assignor to Paragon Electric Company, Two Rivers, Wis., a corporation of Wisconsin Application January 22, 1954, Serial No. 405,528

2 Claims. (Cl. 29—155.5)

This invention relates to improvements in shaded pole motors and method of manufacture thereof.

Heretofore in the preparation and application of shading means for the poles of synchronous motors the pole shading material has been applied to pole pieces arranged in the particular desired pattern with the shading material in individual laminations. An example of this is to be found in U.S. Letters Patent No. 1,996,375, issued April 2, 1935, to A. W. Haydon.

Broadly speaking, the instant invention relates to the provision of shading material in the form of a continuous helically laminated shading means shaped in accord with the pattern of pole pieces and applied thereto in any of the several ways, but the invention includes particularly a method of forming and assembling shading means upon pole pieces with or without the heretofore required staking method involving unusual stresses upon the pole pieces.

The nature of the invention, therefore, is an improvement upon shading means for shaded pole motors and new methods of applying shading rings to the poles to be shaded.

Figure 2:
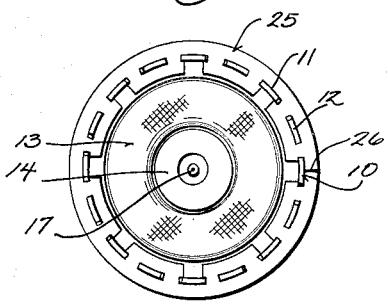
Fig. 2 is a view of the motor of Fig. 1 taken axially with reference to the armature shaft, the armature cup being removed and the shaft being shown in section.
Figure 1:
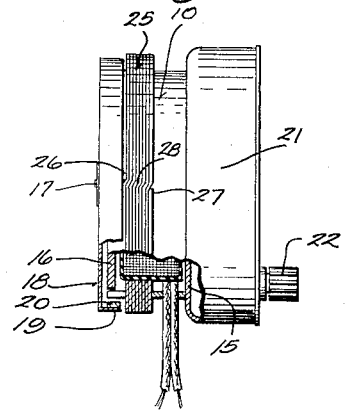
Fig. 1 is a side elevation of a complete motor and gear train housing with a portion of the housing broken away to show the new shading means and its relationship to the operating parts of the complete motor.

As shown in Figs. 1 and 2, a representative type of motor with which this invention is concerned, includes a relatively heavy sectioned ring 10, so slotted and shouldered as to provide a crown shape with individual pole pieces 11 and 12 in mated pairs. In the particular motor shown there are eight of these pairs, thus providing sixteen separate pole pieces. A coil at 13 is built up upon a core 14 which is rigidly secured to a base plate 15 and also rigidly secured to a field plate 16, which extends outwardly radially into contiguity with alternate pole pieces; this not being shown since it is common in this art. The core 14 supports shaft 17 of a cup shaped armature rotor 18, the inner lip of which at 19 supports a hardened steel armature ring 20. The armature rotor mounted on the one end of armature shaft 17 drives the shaft which extends through the core 14 to engagement with a gear train in gear box 21 for the drives of pinion 22, which may be used for any rotary power application purpose.

Figure 3:
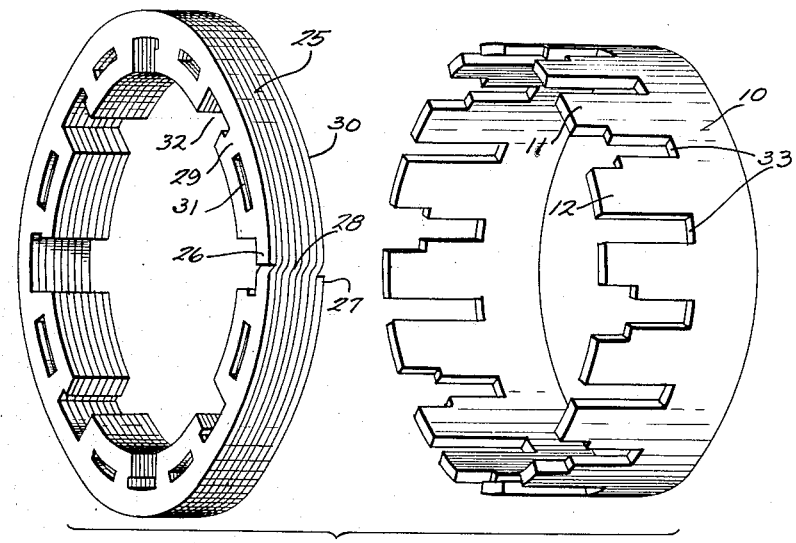
Fig. 3 is an exploded view in perspective of the field ring and pole piece positioned to receive the shading means of this invention, the shading means being shown in helically laminated form and provided with the openings for reception of the pole pieces.

This describes the general environment to which the invention is pertinent. As indicated above, to shade the pole pieces of the field ring 10 it has heretofore been a common practice to apply properly punched individual endless rings of copper or other suitable shading material to the individual poles. In accord with this invention the shading material is made up as shown in Fig. 3 at 25. This shading material is formed of a continuous strip of copper in relatively thin laminations. One end of the strip is shown at 26 and the other end of the strip is shown at 27. When the helical laminations of the shading ring 25 are brought into contiguity, as shown in Fig. 3, they are placed under such pressure as to cause the laminations to slightly offset, as shown in the zone at 28, and the complete shading ring presents a plane surface 29 and the opposite face 30 is likewise plane.

The general annular shape of the shading ring 25 is of such dimensions that apertures 31 for pole pieces 12 and slots 32 for pole pieces 11 receive the respective pole pieces snugly in the rings as the ring is slidably forced into position upon the pole pieces. As the ring 25 assumes its position, as shown in Fig. 1, with the ring firmly seated at the bottoms 33 of the slots between the pole pieces, the final movement and pressure which presses the ring 25 against the bottoms 33 of the slots tend to slightly offset each of the laminations arcuately or circumferentially with respect to each other, thus causing the entire assembly of shading ring 25 and the pole pieces 11—12 to be bound together frictionally. It has been found that when the ring 25 is thus assembled upon the pole pieces no staking or other means of securing the ring upon the pole pieces is necessary, and the pole pieces are braced and more than adequately bonded to the shading material.

Thus, when the shading ring 25 has been placed upon the ring 10 and the field plate 16 has been secured to the core 14, the rotor 18 may be finally assembled upon the shaft 17 to complete an operative motor with the poles properly shaded.

In addition to the features of structure and assembly referred to above the motor made in accord with this invention is found to have excellent efficiency; the reason for which is not fully understood. One apparent reason for increased efficiency in this motor equipped with a helically coiled and laminated shading material is the integration of the shading material whereby thermal conductivity is augmented. In the previously conventional shading rings made up of separate washer-like endless rings laid one against the other the thermal conductivity from one ring to another was impeded, under principles which are well known, whereas in this integral, continuous strip of shading material there is a continuous path for conduct of heat from one helical layer to another, with noticeably cooler operation during energization.

Especially, it is found that the shading material helically formed from a continuous strip of shading material permits of special assembly procedures for better results in contrast with those obtained when the various laminations of shading materials are laid up in the form as individual rings, each of which is a complete annulus. There is a considerable saving in cost of manufacture of this helical shading "ring." Since a continuous lineal strip of shading material is used to shape the ring shown at 25, as shown in Figure 4, it is not necessary to cut out and discard a central disc for each lamination.

Figure 4:
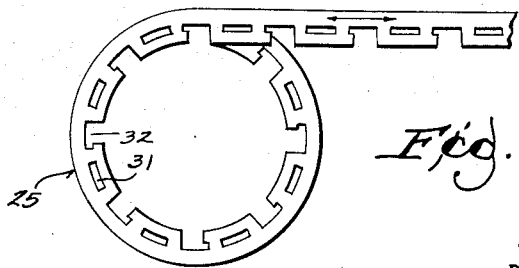
Fig. 4 is a diagrammatic view of a strip of punched shading material in an intermediate step in the formation thereof into a helical ring.

Furthermore, the grain of the metal in this shading material is longitudinal of the strip out of which the helix is formed (see the arrows in Fig. 4). This means that travel of induced current about each of the poles tends to be the same with reference to the grain of the metal as to each pole piece. This is quite different from the condition prevailing where the shading rings are struck out of a disc of sheet material.

I claim:

1. The method of manufacture of shaded poles for motors which includes the preparation of shading material in the form of a helically laminated pattern in which laminations have apertures in registry, preparation of pole pieces in a pattern for reception in said apertures, and application of the shading material upon the pole pieces while the laminations are free to move helically with respect to each other.

2. The method of claim 1 including as a final step the pressure of the shading material onto the pole pieces whereby to offset the laminations slightly from one another and thereby bind the material upon a pole piece.

References Cited in the file of this patent

UNITED STATES PATENTS

| | | |
|---|---|---|
| 919,862 | Heitmann | Apr. 27, 1909 |
| 1,286,138 | Starker | Nov. 26, 1918 |
| 1,920,354 | Carpenter | Aug. 1, 1933 |
| 2,353,305 | Haydon | July 11, 1944 |